(12) United States Patent
Acquaviva et al.

(10) Patent No.: US 8,183,805 B2
(45) Date of Patent: May 22, 2012

(54) SYSTEM FOR CONTROLLING THE STEADY-STATE ROTATION OF A SYNCHRONOUS ELECTRIC MOTOR

(75) Inventors: Sebastiano Acquaviva, Pino Torinese (IT); Piergiorgio Ricco, Turin (IT)

(73) Assignee: Askoll P&C S.r.l. (IT)

( * ) Notice: Subject to any disclaimer, the term of this patent is extended or adjusted under 35 U.S.C. 154(b) by 277 days.

(21) Appl. No.: 12/666,667

(22) PCT Filed: Jun. 23, 2008

(86) PCT No.: PCT/IB2008/052484
§ 371 (c)(1),
(2), (4) Date: Dec. 24, 2009

(87) PCT Pub. No.: WO2009/001285
PCT Pub. Date: Dec. 31, 2008

(65) Prior Publication Data
US 2010/0201303 A1 Aug. 12, 2010

(30) Foreign Application Priority Data

Jun. 26, 2007 (IT) ............................. TO2007A0458

(51) Int. Cl.
H02P 27/02 (2006.01)
H02P 6/18 (2006.01)
(52) U.S. Cl. ............ 318/400.26; 318/400.3; 318/400.34
(58) Field of Classification Search ............. 318/400.01, 318/400.02, 400.26, 720, 700, 400.13, 400.14, 318/400.2, 400.3, 400.32, 400.34, 400.35
See application file for complete search history.

(56) References Cited

U.S. PATENT DOCUMENTS

| | | | | |
|---|---|---|---|---|
| 5,434,491 A * | 7/1995 | Marioni | | 318/700 |
| 6,114,827 A * | 9/2000 | Alvaro | | 318/717 |
| 6,239,563 B1 * | 5/2001 | Kunz | | 318/400.07 |
| 6,861,819 B2 * | 3/2005 | Marioni | | 318/721 |
| 2001/0011877 A1* | 8/2001 | Lelkes et al. | | 318/700 |
| 2003/0230999 A1 | 12/2003 | de Nanclares et al. | | |
| 2007/0114957 A1 | 5/2007 | Aarestrup | | |
| 2010/0188037 A1* | 7/2010 | Acquaviva et al. | | 318/721 |

FOREIGN PATENT DOCUMENTS

| | | |
|---|---|---|
| EP | 0207430 A2 | 1/1987 |
| EP | 0682404 A2 | 11/1995 |
| EP | 0851570 A1 | 7/1998 |
| EP | 1919074 A2 | 5/2008 |
| FR | 2729256 A2 | 11/1995 |

* cited by examiner

*Primary Examiner* — Bentsu Ro
(74) *Attorney, Agent, or Firm* — Akerman Senterfitt

(57) ABSTRACT

The control system comprises a switch (TR) in series with a stator winding (W) between two terminals (A, B) connected to an alternating supply voltage source (V), a first detector circuit (2) capable of providing a signal ($V_{oi}$) indicating when the current (I) in that winding (W) is zero, a second detector circuit (1) capable of providing a signal ($V_w$) indicating the magnitude of the supply voltage (V), and a control unit (MC) connected to the first and second detection circuits (2; 1) and designed to control the switch (TR) in such a way as to cause an alternating current (I) of the same frequency as the supply voltage (V) and having alternating positive and negative phases (11, 12) to pass through the winding (W), separated by intervals during which it remains at zero, of a duration ($t_p$) which varies according to an increasing function of the magnitude of the supply voltage (V).

4 Claims, 3 Drawing Sheets

SYSTEM FOR CONTROLLING THE STEADY-STATE ROTATION OF A SYNCHRONOUS ELECTRIC MOTOR

This invention relates to a system for controlling the steady-state rotation of the rotor of an electric motor of the synchronous type (that is in a synchronous condition), with or without position sensors.

One object of this invention is to provide such a control system which is simple and economic to manufacture, and which is reliable in operation.

This and other objects will be accomplished according to the invention through a control system whose principle characteristics are defined in claim 1.

Figure 1:
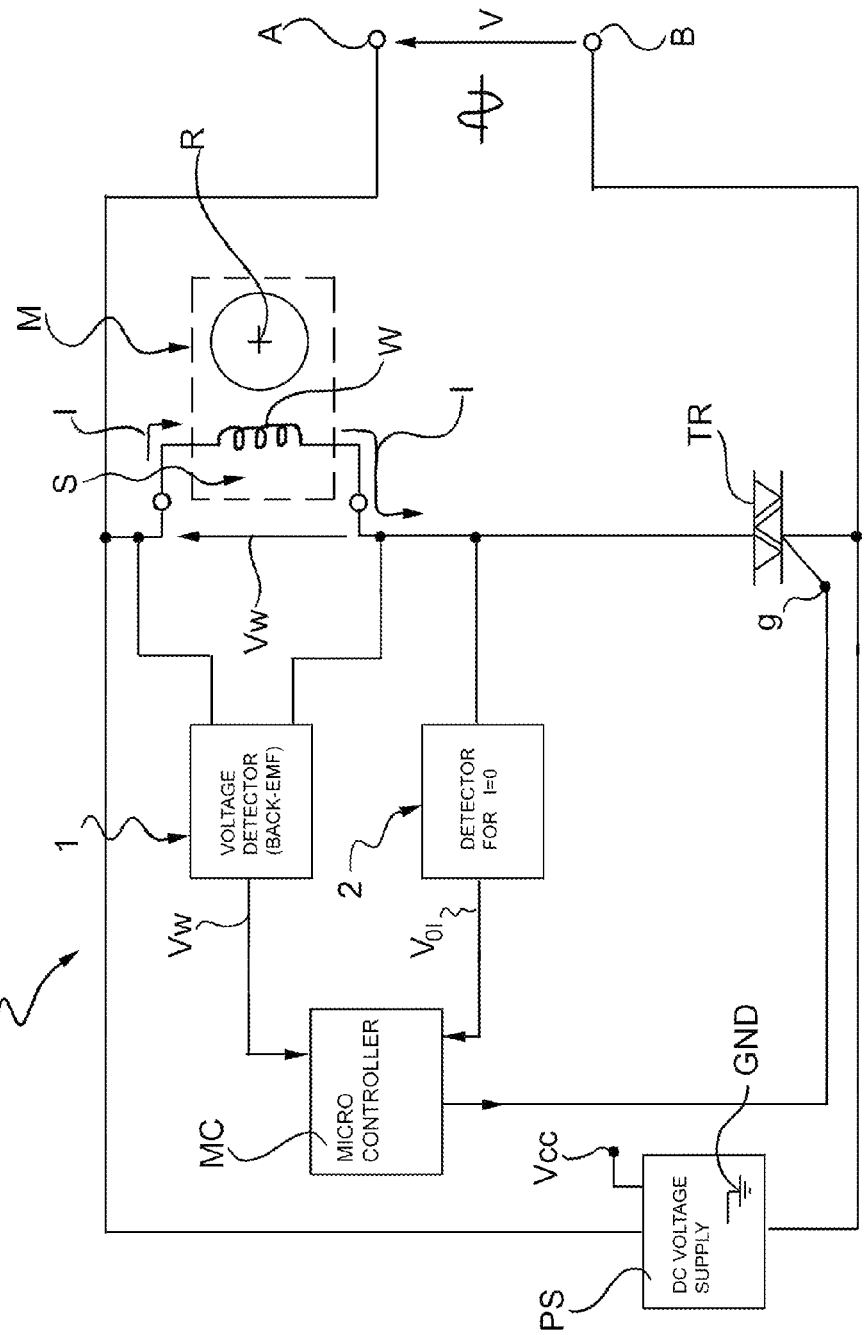
Figure 2:
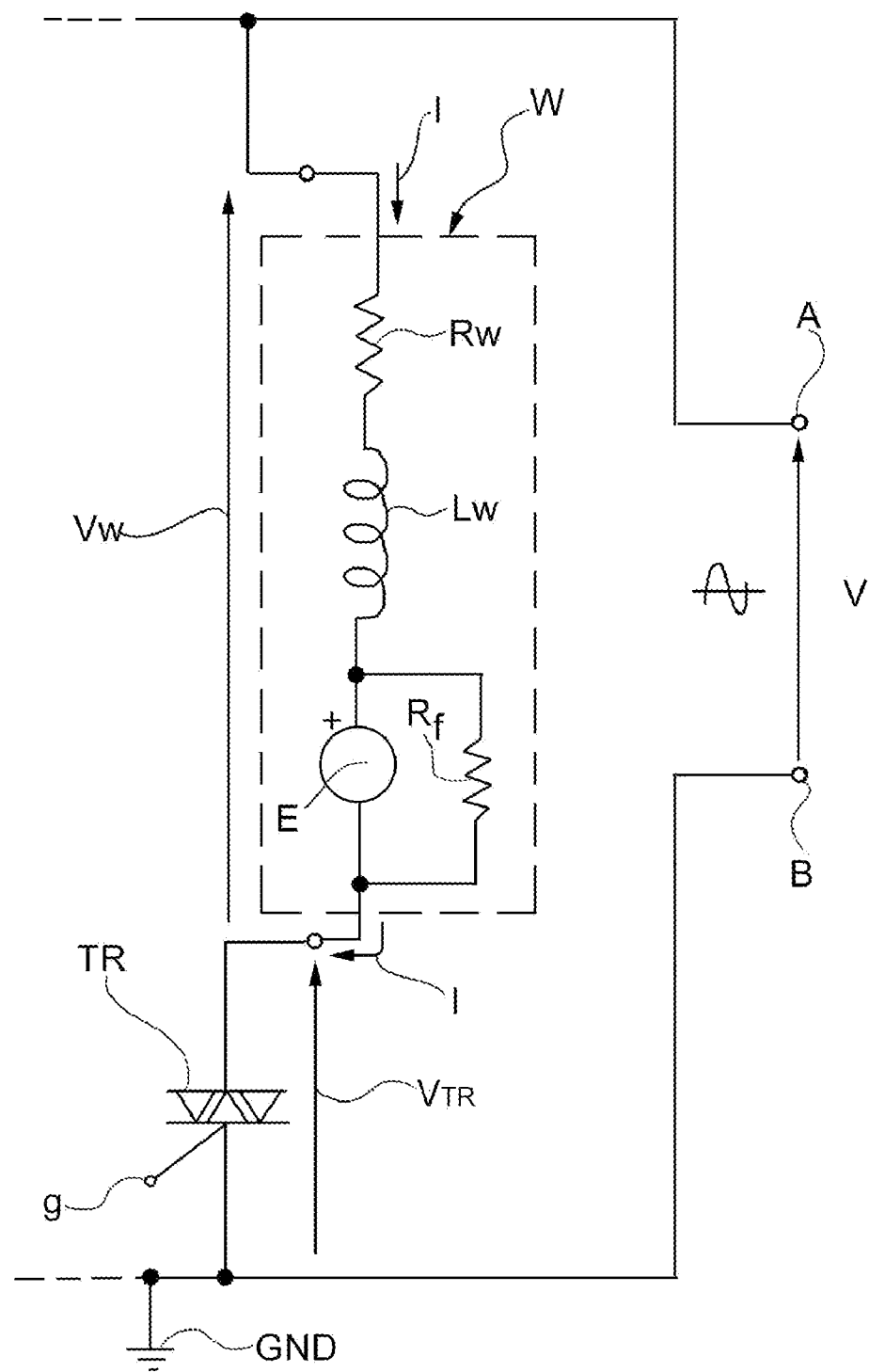
Figure 3:
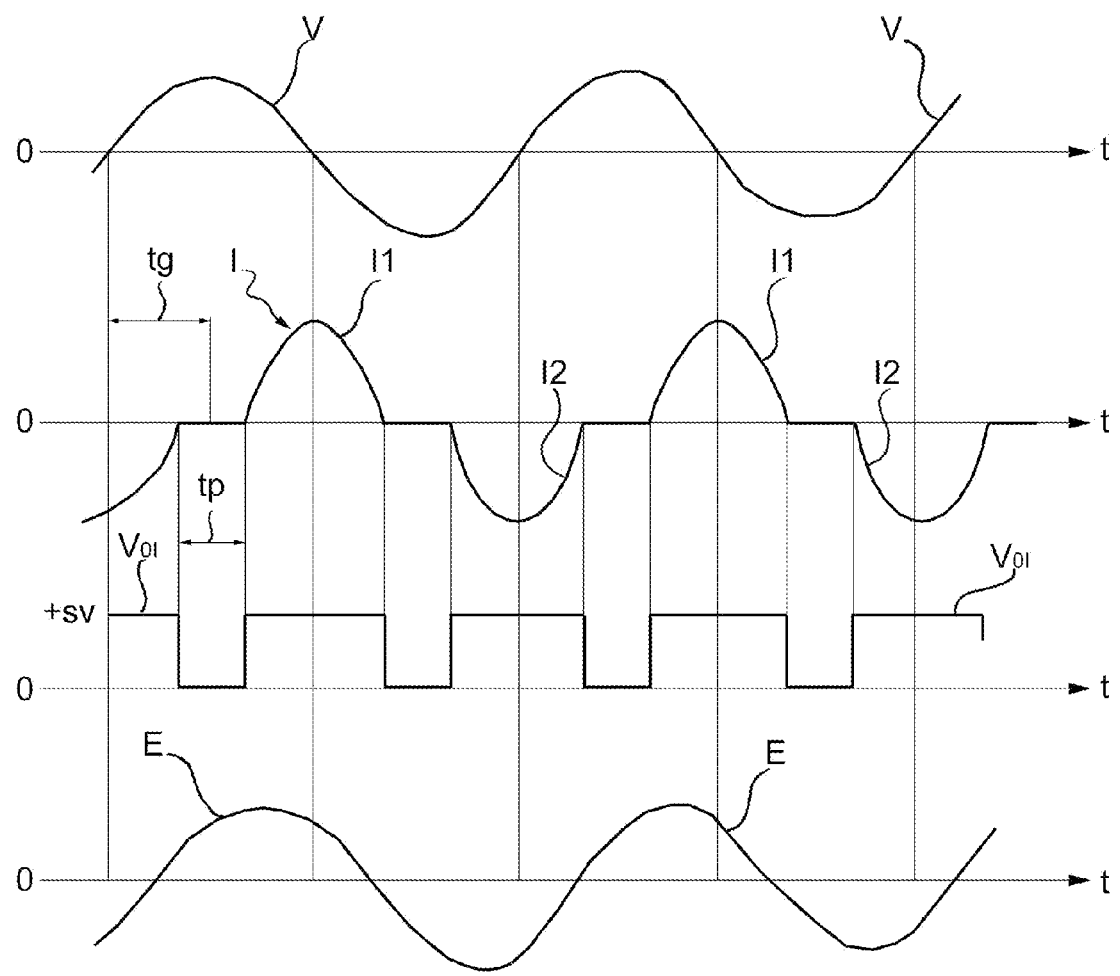

Other advantages and characteristics of the present invention will become clear from the following detailed description which is given with reference to the appended drawings which are provided purely by way of non-limiting example and in which:

FIG. 1 is an electrical diagram, partly in block form, of a control system for a synchronous electric motor according to this invention, FIG. 2 is a partial illustration of the motor's control system, in which an equivalent circuit for the stator winding is shown, and FIG. 3 is a diagram which shows examples of changes in electrical parameters and signals in the system in FIG. 1 under the condition of rotation under steady-state conditions, that is rotating at the synchronisation speed.

M in FIG. 1 indicates as a whole a synchronous electric motor, for example a motor for the pump of a dishwashing machine.

Motor M comprises a rotor R with permanent magnets and a stator S which includes a winding W.

In its construction, motor M may be of the type illustrated and described for example in European patent application EP 0 207 430 A1 or in European patent EP 0 851 570 B1.

A control system, indicated as a whole by CS, is associated with motor M.

Control system CS comprises an electronic switch which in the example illustrated is a triac TR connected in series to winding W of motor M between two terminals A and B intended to be connected to an alternating current supply voltage source V such as the normal 50 (60) Hz electricity distribution mains.

Triac TR has its gate G connected to an output from a microcontroller MC.

Control system CS also comprises a first detector circuit indicated by 1. This circuit is a voltage detector and has its input connected to the ends of the winding of stator W and its output connected to microcontroller MC.

As will be more clearly apparent below, under particular operating conditions the voltage at the ends of stator winding W of motor M is represented by the magnitude of the back-electromotive force (back-EMF) developed on this winding, while under other conditions this voltage corresponds to the supply voltage V.

Control system CS also comprises a second detector circuit 2 with its input connected between stator winding W and triac TR and its output connected to microcontroller MC. This detector can provide a signal $V_{OI}$ which indicates when current I flowing in stator winding W under operating conditions is zero.

Detector circuits 1 and 2 may if appropriate be partly or wholly integrated in microcontroller MC.

In FIG. 1, PS indicates a direct current voltage source connected between supply terminals A and B to provide a direct operating supply voltage $V_{CC}$. Voltage supply PS internally creates an earth reference GND for control system CS.

Microcontroller MC is designed to control triac TR in such a way that when motor M is under operating conditions triac TR conducts only when the sign or direction of current I flowing in winding W and the sign or polarity of the back-EMF developed in that winding W are such as to satisfy a predetermined relationship.

In particular, assuming that current I is positive when it flows in the direction indicated by the arrows in FIGS. 1 and 2, and assuming that the sign of the back-EMF E is positive when its positive polarity occurs at supply terminal A, the control provided by microcontroller MC is such that triac TR becomes conducting so that the sign of current I is consistent with the sign of the back-EMF E or that at the same time $$I>0 \text{ and } E>0, \text{ or } I<0 \text{ and } E<0 \tag{1}$$

In FIG. 2, winding W is shown as its equivalent circuit (Thevenin equivalent circuit). In this representation $R_W$ and $L_W$ represent the resistance and inductance of winding W, E represents the back-EMF developed in that winding and $R_F$ represents the resistance due to the losses in the magnetic circuit associated with stator winding W.

With reference to FIG. 2, if the voltage at the ends of stator winding W (which is applied to the input of detector circuit 1 in FIG. 1) is indicated by $V_w$ and $V_{TR}$ indicates the voltage at the terminals of triac TR (considered to be positive when its positive polarity occurs at terminal A), it follows that $$V_W = V - V_{TR} = R_W I + L_W dI/dt + E \tag{2}$$

From equation (2) above it follows that when triac TR is not conducting, and therefore the current I in motor M is zero (I=0), then $$V_w = E = V - V_{TR} \tag{3}$$

or the voltage $V_w$ acquired by microcontroller MC through detector circuit 1 under such conditions represents the magnitude of the back-EMF E. When instead triac TR is conducting, voltage $V_w$ essentially corresponds to the supply voltage V.

Control system CS can therefore be designed to acquire electromotive force E, in for example the following way: detector circuit 3 signals to microcontroller MC that the condition that current I is zero is fulfilled and in this situation microcontroller MC can interpret the signal provided by detector circuit 1 as representing the back-EMF E.

Other means for acquiring/determining electromotive force E may however be used without using detector circuit 2.

As described above, back-EMF E can be acquired during the time intervals when current I is zero. As will be more clearly apparent below, these time intervals may be easily found by observing the voltage $V_{TR}$ at the terminals of triac TR. In fact, if in absolute terms $V_{TR}$ is more than for example 1V, then triac TR switches off and equation (3) shown above applies, otherwise if $V_{TR}$ is less than 1V then I≠0.

In point of fact back-EMF E can also in principle be determined when I≠0, but in this case it can be obtained for example by solving the differential equation $$L_W dI/dt = V_W - E - R_W I \tag{4}$$

which is more complicated.

It should be noted that when current I in motor M becomes zero, triac TR automatically switches off and the voltage at its terminals $V_{TR}$ changes almost instantaneously from a value of approximately ±1V to a value which according to equation (3) is equal to V−E.

The operation of control system CS according to the invention will now be described with particular reference to the graphs in FIG. 3.

It is initially assumed that rotor R of motor M has been set in rotation in the desired direction, in one of the various ways which are in themselves known, and the transitory stage during which the angular velocity of that rotor changes from a value of zero to the synchronisation value corresponding to the frequency of the supply voltage V has come to an end.

Under steady-state operating conditions microcontroller MC controls triac TR in such a way as to cause an alternating current I of the same frequency as supply voltage V to pass through stator winding W. As will be seen in the second graph at the top in FIG. 3, alternating current I passing through winding W has portions I1 and I2 which are alternately positive and negative, separated by intervals in which it remains at zero for a time $t_p$.

Current I is therefore subdivided into phases. This has the effect of reducing the effective value of current I, allowing for rephasing between the back-EMF E and the current, with a consequent reduction in losses in the copper and a corresponding increase in efficiency.

The control system according to the invention provides that the duration $t_p$ of the intervals during which current I remains at zero varies according to an increasing function of the magnitude of the measured or calculated supply voltage V.

Microcontroller MC uses a reading of the mains voltage V, obtained through voltage detector circuit 1, and as a consequence controls the time when triac TR is triggered again with respect to the instant when the preceding current half-wave becomes zero.

For an electric motor M having known characteristics, and knowing the permissible range of the supply voltage and the load applied to the motor shaft, it is possible to define a minimum value of the voltage beyond which the duration $t_p$ of the interval during which current I remains zero increases linearly in relation to the magnitude of the supply voltage, and therefore determines the slope of the functional relationship correlating these parameters.

Having defined the rated motor load M, the functional relationship which links supply voltage V and time $t_p$ is such as to maximise the efficiency of electric motor M and make it independent of the value of supply voltage V. This control therefore ensures that the system is also stable to changes in supply voltage V and the mechanical load. For load values other than the rated value (for which efficiency is optimised) motor M nevertheless has constant high efficiency and maintains power consumption constant regardless of changes in the supply voltage. This is possible because of the intrinsic ability of the system to adapt to changes in load by varying the phase relationship between supply voltage V and the first harmonic of phased current I.

An important characteristic of the control system according to the invention lies in the fact that the delay $t_p$ in triggering triac TR does not relate to a change to zero in the supply voltage V but to the instant when the preceding half-wave of current I becomes nothing, thus making it possible to adjust automatically to changes in the supply voltage and load by varying the delay between the supply voltage V and the first harmonic of phased current I.

If the delay $t_p$ in retriggering triac TR relates to the zero-crossing of supply voltage V, as occurs in many systems used for example to control the luminosity of incandescent lamps, or the phasing of PSC motors, and had a interval which depended upon the supply voltage, then when changes in mechanical load occurred the system would no longer be in a position to adapt automatically because the power factor for the system (defined as the cosine of the delay angle between the zero-crossing of voltage V and the zero-crossing of the first harmonic of current I, indicated by $t_g$ in FIG. 3) is not able to change; in fact an increase in the mechanical load would result in an increase in the magnitude of phased current I but no change, or an insignificant change, in the duration $t_p$ of the interval during which the latter remains at zero.

With the control system according to this invention this limitation is diminished and the system is able to adapt automatically even to upward or downward changes in load, ensuring high efficiencies which differ very little from the maximum design efficiency which is obtained under normal load conditions.

According to a further option the microcontroller MC may be designed to acquire the magnitude of the back-EMF E developed in stator winding W and then modify the duration $t_p$ of the intervals during which current I remains at zero, which may also be in accordance with a predetermined function for the magnitude of the back-EMF E. This method of implementing control makes it possible to ensure that the torque developed is always positive and never negative, reducing operating noise. In addition to this, acquisition of the magnitude of the back-EMF E during the intervals during which the current remains at zero enables microcontroller MC to detect whether rotor R has actually continued to rotate.

According to a further option, time $t_p$ may be conveniently regulated in such a way that it does not vary within the scope of a single period of the supply voltage V, regardless of the magnitude of that voltage and/or the back-EMF E (that is so that the interval for which current I remains at zero after positive current half-wave 11 is made to be equal to the time for which the current remains at zero after negative current half-wave 12); this makes it possible to avoid undesired imbalance in the waveform of current I.

A further option designed to eliminate undesired imbalances in the waveform of current I provides for keeping the time between two successive triggerings of triac TC (relative to the same period of supply voltage V) less than or at most equal to half the period of supply voltage V (for example, for applications at 50 Hz this half-period corresponds to 10 ms).

Naturally, the principle of the invention remaining the same, the forms of embodiment and details of construction may be varied widely with respect to those described and illustrated, which have been given purely by way of example, without thereby departing from the scope of the invention, as defined in the appended claims.

The invention claimed is:

1. A system for controlling the steady state rotation of an electric motor (M) of the synchronous type comprising:
   an electronic switch (TR) operatively connected in series to a stator winding (W) of the motor (M), between a first and a second terminal (A, B) intended to be connected to an alternating voltage supply source,
   first detector means capable of providing a signal ($V_{oi}$) indicating when the current (I) in that winding (W) is zero, and
   control means (MC) connected to the first detector means and designed to control the electronic switch (TR) in such a way as to cause an alternating current (I) to pass through the stator winding (W), said current (I) having the same frequency as the supply voltage (V) and having portions (I1, I2) which are alternatively positive or negative, separated by periods during which it remains at zero;
   the system comprising:
   second detector means capable of providing the control means (MC) with a signal ($V_w$) indicating the magnitude of the supply voltage (V), and in that the control means (MC) are designed to cause a duration ($t_p$) of said separation periods to vary according to an increasing function of the magnitude of the detected supply voltage (V).

2. The control system according to claim 1, wherein said second detector means are capable of providing a signal ($V_w$) indicating the magnitude of the back-EMF (E) developed in the said winding (W), and in which the control means (MC) are designed to:

alter the duration ($t_p$) of said separation periods during which the current (I) in the stator winding (W) remains at zero, which may also be in accordance with a predetermined function of the said back-EMF (E), and check loss of synchronicity in the motor (M).

3. The control system according to claim 1, in which the control means (MC) are designed to modify the duration ($t_p$) of said separation periods during which the current (I) in the winding (W) remains at zero such that the said duration ($t_p$) of said separation periods does not vary within a single period of the supply voltage (V) regardless of the magnitude of that voltage (V) and/or the back-EMF (E).

4. The control system according to claim 1, in which the control means (MC) are designed to alter the duration ($t_p$) of said separation periods during which the current (I) in the winding (W) remains at zero in such a way as to ensure that the time between two successive triggerings of the electronic switch (TR) relative to a given period of the supply voltage (V) is less than or at most equal to half the period of the supply voltage (V).

* * * * *